United States Patent [19]
Reed

[11] Patent Number: 5,074,282
[45] Date of Patent: Dec. 24, 1991

[54] SOLAR WATER HEATER

[76] Inventor: Peter D. Reed, 2115 W. Royal Palm Rd., Apt. 1048, Phoenix, Ariz. 85021

[21] Appl. No.: 697,263

[22] Filed: May 8, 1991

Related U.S. Application Data

[62] Division of Ser. No. 602,749, Oct. 24, 1990, abandoned.

[51] Int. Cl.⁵ .............................................. F24J 2/40
[52] U.S. Cl. .................................... 126/420; 126/446; 137/59
[58] Field of Search ............... 126/420, 418, 447, 450, 126/446; 137/59-62

[56] References Cited

U.S. PATENT DOCUMENTS

| | | | |
|---|---|---|---|
| 3,319,657 | 5/1967 | Nyiri | 137/59 |
| 3,972,317 | 8/1976 | Gallagher | 126/446 |
| 4,084,575 | 4/1978 | Nicewonger | 126/446 |
| 4,094,301 | 6/1978 | Sorenson et al. | 126/446 |
| 4,120,284 | 10/1978 | Cotsworth | 126/446 |
| 4,164,935 | 8/1979 | Marles et al. | 126/447 |
| 4,338,921 | 7/1982 | Harder | 126/446 |
| 4,345,587 | 8/1982 | Carvalho | 126/446 |
| 4,381,816 | 5/1983 | Granetzke et al. | 137/59 |
| 4,416,265 | 11/1983 | Wallace | 126/446 |
| 4,624,242 | 12/1986 | McCall | 126/446 |
| 4,928,754 | 5/1990 | Westerberg | 137/59 |

FOREIGN PATENT DOCUMENTS 2530788  1/1984  France ............................. 126/446

Primary Examiner—James C. Yeung
Attorney, Agent, or Firm—J. Michael McClanahan

[57] ABSTRACT

A solar water heater absorber with controllable freeze damage is described, the absorber having removable heat absorbing panels attached on opposite sides to each riser, each panel having a flat portion to receive the sun's rays and a folded curved portion to reside next to the horizontal pipe riser. An elongated "C" clamp compressing the curved portion of both panels to the riser provides efficient heat conduction. The risers are arranged in a serpentine fashion with manifolds attaching appropriate adjacent ends and vertical freeze expansion pipes attaching to the manifolds through bridge pipes, one freeze expansion pipe at each end of the risers. At one end of each freeze expansion pipe is a test cap. Water flow through the bridge pipe is restricted by an internal plug with orifice, a reduced diameter bridge pipe, or an opening formed in the manifold or into connected freeze expansion pipes encompassed by the bridge pipe. In the event of a mild freeze, water freezing in the riser will expand into the freeze expansion pipes and escape by rupturing the test cap and thereby reduce damage. If the freeze is sufficiently hard to rupture a riser, the riser may be removed and replaced very easily.

7 Claims, 1 Drawing Sheet

SOLAR WATER HEATER

This is a division of copending application Ser. No. 602,749 filed on 10-24-90., abandoned.

BACKGROUND OF THE INVENTION

1. Field of the Invention

The field of the invention is improvements to solar water heaters and in particular to construction of absorber panels and apparatus for controlling freeze damage.

2. Description of the Related Art

Solar water heaters, in the last couple of decades, have had considerable impact upon homeowners and business largely because of the rising costs of fossil fuels. Improvements in solar water heaters were forthcoming regularly and now, to a large extent, construction of the solar water heater absorber has become somewhat standardized in a large number of the manufactured water heaters. The various major elements of solar water heaters comprise the absorber, i.e., that portion of the heater which directly receives the sun's rays and transfers the received heat energy to water or other fluids running through connected pipes or risers; the collector, i.e., the structure encapsulating the absorber in an insulated box-like frame with a transparent top; and the water storage tank usually distant from the collector.

There are two basic types of solar water heaters, the open and closed loop systems. In the closed loop system, water or antifreeze or other liquid is continuously circulated between the absorber on the roof and a heat exchanger interiorly to a water storage tank in the house. The water to be heated for residential or commercial use is in contact with the heat exchanger or radiator to receive the energy which has been brought down from the absorber on the roof area by means of pipes in a continuously circulating manner. In an open loop system, water which is used by the household or business is circulated through the absorber and then mixed with cold water for distribution as a hot water source. It may or may not be temporarily stored in a storage tank. If so, the storage tank is in line with the home water supply.

Construction of the absorber as standardly practiced generally takes the form of firstly placing a series of parallel semi-circular grooves in a piece of flat sheet metal, such as sheet copper, and then placing individual cross-runs or risers of copper pipe into these semi-circular grooves. The pipes are physically soldered to the sheet metal. Generally the sheet metal is rectangular in shape, being 3 to 4 feet in height and 8 to 10 feet in length. Often there may be 6 to 8 or more risers on one panel or sheet of the metal. The panel, when installed, is aligned long-ways, i.e., one of the length sides resting upon the roof. The panel is set to face the sun, sloped at an angle to the horizon, and painted black to more efficiently absorb the sun's rays. The copper pipes are usually on the underside (away from the sun) of the absorber panel.

At each end of the absorber panel is a transversely situated elongated pipe manifold to which each of the risers attached to the solar panel are connected. The manifold is not soldered or attached to the absorber panel. The water flows into one manifold on one side of the solar panel and then is transferred to the manifold on the opposite side through the horizontal risers soldered to the backside of the absorber panel.

The solar absorber, including the two side manifolds, are contained in a collector box, usually heat insulated on the sides and bottom, having a glass or clear plastic top through which the sun's rays pass. In most cases, water is introduced into the bottom of one manifold on one side of the absorber and removed at the top side of the opposite manifold. In operation, cold water is passed through the side of the collector to the absorber manifold to flow in parallel paths through the cross pipes soldered to the solar panel to the opposite manifold, the hot water rising and taken out from the opposite manifold at the other side of the collector.

Another variation of the solar absorber is to connect adjacent risers at opposite sides of the absorber in a fashion such that the water circulates in a serpentine fashion across the panel, the cold water entering at the bottom side of the absorber panel and then exiting at the top most riser at the side of the absorber panel.

The biggest problems occur during winter nights when the outside temperature drops below freezing and causes the water inside the pipe to freeze and thereby rupture the copper risers. Generally, the rupture will occur in that portion of the copper pipe soldered within the half-round groove formed in the absorber panel rather than that portion of the copper risers which are immediately accessible. After the water in the cross pipe freezes and causes the pipe to rupture, the ice in the pipe begins to melt during the late morning hours and water begins to leak from the pipe, remembering, especially in cases of open loop systems, that the solar water heater is still in the water distribution system. The collector fills with water which in turn then runs down the roof of the building.

As can be readily seen, repairs of commonly manufactured solar heaters is difficult. Firstly, the leak location has to be ascertained, the exactness of which may not be easy, and secondly, it is virtually impossible to repair the pipe for most leaks proximate the soldered portion next to the panel. Consequently, the pipe must be removed from the panel. This operation in itself takes considerable time and is more costly than just replacing the whole panel with a new panel, which is usually the case. As a consequence, repair of solar absorbers is very expensive, regardless of what method is used.

Thus it becomes readily apparent that there are improvements, which if added to the solar absorber panel, would benefit the industry for the absorbers which utilize the serpentine type water circulation. Firstly, to construct apparatus which would allow for freezing of the pipes in an absorber panel and would tolerate the freeze without rupturing the risers attached to the underside of the panel. To accomplish this, means must be incorporated within the piping system to accommodate the expanded ice and water. These means include the placement of a special freeze expansion pipe communicating with each riser which provides means to rupture a test cap by the freezing expanding water and allow escape of the water and ice which would otherwise cause the rupture.

It is also readily apparent that in the event of a very deep and hard freeze where even the above preliminary means taken to minimize damage were overcome by the hardness of the freeze, if the solar absorber were so constructed that individual risers in which water froze and ruptured could be quickly and easily removed, and done inexpensively, great improvement in the repair of solar water heaters benefit the industry.

It is therefore obvious that there is need for apparatus incorporated into the construction of solar water heaters which provide ways to minimize freeze damage in solar water heaters and which, in the event of a hard freeze and substantial damage to the solar water heater, still minimizes the repairs of the solar water heater.

SUMMARY OF THE INVENTION

The embodiment of the invention described consists of apparatus to control freeze damage in solar water heaters. Firstly, in the case of the freeze in one of the horizontal risers connected to the absorber panel, the panel is constructed of a series of narrow elongated strips rather than a single very wide elongated sheet. Each of these strips are operably attached to the absorber horizontal risers by a "C" clamp arrangement. More specifically, elongated strips of sheet metal such as cooper or aluminum is folded along its longitudinal edge about 1/5 to ¼ of the width of the strip, the fold being slightly more than a 90 degree angle. Then, upon the short width folded portion, a circular arc is formed of the same diameter as the outside diameter of the riser. Two of these strips are thusly formed for each riser. The strips are placed on either side of the riser, then, an elongated "C" clamp engages the underside of each arcuate formed portion of the metal strip at their point of partially wrapping around the riser. By this means, the metal strips are thermally connected to the risers such that radiant energy received by the strip is conducted to the metal riser to heat the water interiorly. The strips may be painted with speciality radiant energy absorbing paint after assembly or, if desired, before assembly.

Further, the risers are arranged in a parallel fashion wherein, attached at each end of each riser is a 90 degree elbow pipe with a short manifold pipe to convey the water from one riser to its next adjacent riser. Thus, the serpentine configuration of the risers is formed. Since each riser will have attached to each side an elongated solar strip, the manifold pipe at each end which completes the serpentine arrangement must be slightly longer than the width (less the folded over portion) of two elongated strips since it is intended that the strips shall overlap, but only a 1/16 or ⅛ inch from strip to strip.

Thus, if there should be a freeze in one of the risers causing that pipe to rupture, the pipe may be easily removed by unsoldering the elbow at each end of the pipe and removing of the pipe and its two attached elongated metal strips. The "C" clamp then is removed and the strips separated from the pipe. A new riser is then substituted for the ruptured riser, and the two strips placed against the outside surface of the pipe and the "C" clamp re-attached. It may be necessary to clean the arcuate shaped surface of the metal strips to assure good thermal connection with the riser. The riser is then reinserted in its position with the plurality of risers and the elbows re-soldered. As a practical matter, it may be necessary to unsolder and then re-solder the whole manifold pipe and 2 elbows on each end of the riser.

Additionally enhancing the feature of the ease of replacing ruptured riser is the addition at both ends of the solar collector of a freeze expansion pipe operably attached to the manifold pipe at one end of each riser. This freeze expansion pipe is specially constructed to communicate with each turn of the serpentine shaped piping through a smaller connecting bridge pipe, a bridge pipe fitted with a plug with an interior orifice, or placing a small orifice in the manifold or in the freeze expansion pipe at their connection with the bridge pipe. In construction of the freeze expansion pipe, the lower end of this pipe is capped with a pressure cap and the opposite upper end protrudes through the side wall of the collector, and is capped with a test cap. Prior to penetration of the collector wall, the freeze expansion pipe narrows to a smaller pipe which is capped with the test cap.

It is believed that when water in the solar collector begins to freeze, the center in the lower most riser freezes first. As the water progressively freezes in the riser outward of the center portion (and expands as it freezes), it will push on the water in the freeze expansion pipe. As the freeze continues, it will force water up through and out the test cap at the top of the solar collector, thus allowing the water to be vented before it freezes and ruptures the risers.

Thus, water trapped in each side of the collector by the frozen center sections is given a place to move and exit the collector and out the test cap of each freeze expansion pipes.

By such measures, water may be forced out of the serpentine piping for mild freezes. In the event of a hard freeze where even the risers themselves rupture, each riser may be easily removed and replaced. Generally, however, only one or two risers will rupture.

Since orifices in the bridge pipe (or small tubes or orifices in the manifold or freeze expansion pipe) are used to connect the end manifold pipe portions of the serpentine piping to the freeze expansion pipe, little or no water is diverted from traversing the full serpentine path to the water to be solar heated, thus avoiding short cycling of the water.

According, it is an object of the subject invention to provide a solar water heater which provides apparatus for controlling freeze damage.

It is another object of the subject invention to provide a solar water heater wherein individual risers may be easily removed and replaced.

It is still a further object of the subject invention to provide a solar water heater in which excess water may be safely vented as ice fills the interior of the risers.

Other objects of the invention will in part be obvious and will in part appear hereinafter. The invention accordingly comprises the apparatus possessing the construction, combination of elements, and arrangement of parts which are exemplified in the following detailed disclosure, and the scope of the invention which will be indicated in the claims.

BRIEF DESCRIPTION OF THE DRAWINGS

For further understanding of the features and objects of the subject invention, reference should be had to the following detailed description taken in connection with the accompanying drawings wherein.

In various views, like index numbers refer to like elements.

DETAILED DESCRIPTION OF THE PREFERRED EMBODIMENT

Figure 1:
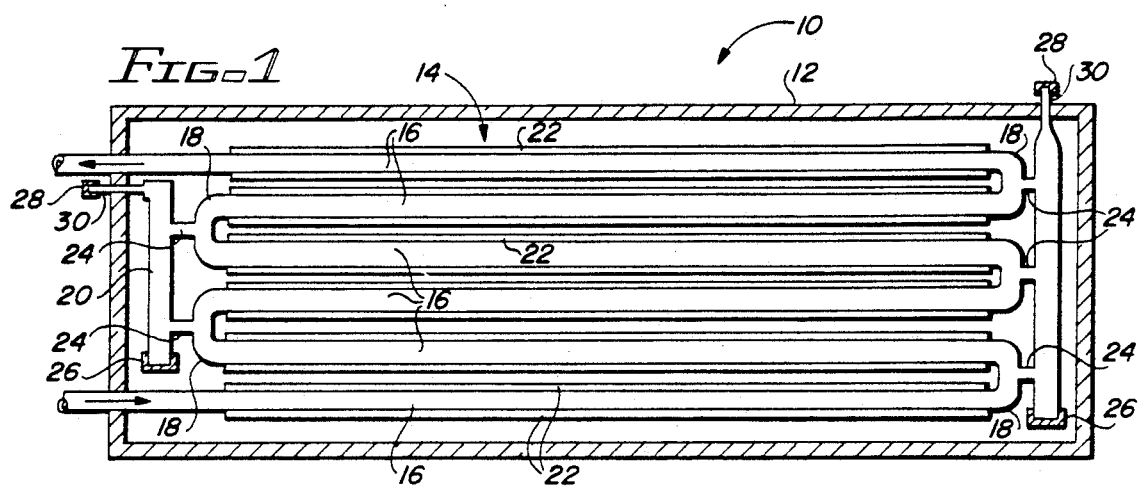
FIG. 1 is a bottom plan view of the subject invention in the solar collector.

Referring now to FIG. 1, a bottom plan view is shown of the subject solar water heater collector 10, and in particular, the box-like collector frame 12 in which resides the radiant solar heat absorber 14. Collector frame 12 is in many cases is constructed of wood or other similar material on its sides, it adapted to house absorber 14 with risers conveying the water from one side of the absorber to the other. Collector frame 12 has a bottom which similarly may be wood or metal and a top of clear glass or plastic through which the sun's rays pass. Collector frame 12 is designed to be insulative, i.e., it will be lined with insulative type material on the sides and bottom.

Absorber 14 shown in FIG. 1 consists of the individual risers 16, of which six is shown in FIG. 1, where, at each end of risers 16 are the connecting pipes consisting of two 90 degree elbows and a short manifold pipe 18. As can be seen in FIG. 1, the top and the bottom risers at the far left are further extended to pass into and out of the side of the collector frame 12. Arrows are shown indicating water flow direction. At both ends are the freeze expansion pipes 20 which will be discussed in more detail shortly and in connection with FIG. 3.

Figure 2:
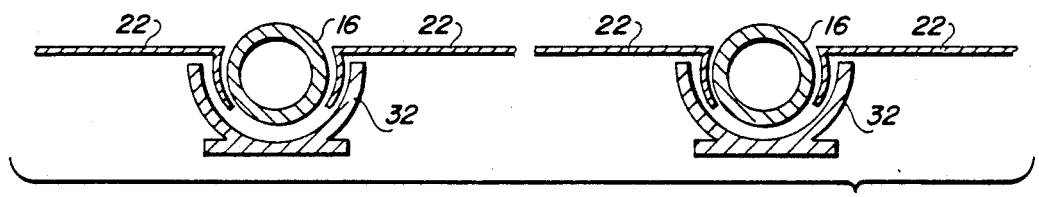
FIG. 2 is a cross-sectional view of the subject invention showing the risers and their operably attached panels.

Shown attached to each of the risers 16 are the elongated heat absorbing panels 22, two of which are operably attached to each of the risers 16 to conduct the radiant heat energy absorbed by the panels into the risers 16 which in turn conduct the heat energy into the water flowing therethrough. Removed from view is the means securing heat absorbing panels 22 to riser 16, namely the "C" clamp. This is shown in FIG. 2. Every riser 16 in absorber 14 has two elongated panels 22 attached to it, one on either side, and the panels are so constructed that their flat surfaces lay parallel to each other and in the same plane to form an essentially flat surface, and overlap at their edges by a very short distance, such as 1/16 to ⅛ inch. Solar absorber 14 shown in FIG. 1 comprising six risers and their attached elongated panels may have outer dimensions of 3 to 4 feet wide and 8 to 10 feet long. Obviously, the collector frame will slightly larger than the above dimensions since it has to incorporate absorber 14.

Referring now to the right-hand side of FIG. 1, freeze expansion pipe 20 is shown, its longitudinal length extending transversely to the longitudinal length of risers 16. Freeze expansion pipe 20 makes connection to the risers by attaching at each of the connecting manifold pipes 18. As will be detailed following, the purpose of freeze expansion pipe 20 is to control freeze damage in the event that the water interiorly to risers 16 should freeze.

Shown attaching freeze expansion pipe 20 to the connecting pipes 18 is bridge pipe 24, bridge pipe 24 being the same size or smaller than the diameter of riser 16 depending upon the particular water flow restriction device utilized. This will be later explained. As a rule, risers are ½ inch I.D., ⅝ inch O.D. Freeze expansion pipe 20, which has a diameter of ¾ inch I.D., ⅞ inch O.D., may be 3 to 4 feet long, connects with each of bridge pipes 24, which, if orifices are used, may be the same diameter as the risers. Freeze expansion pipe 20 has at its lower end a pressure cap. The opposite end, which, when in operation, is the higher elevated end, is narrowed and has an extension protruding through the side of the collector frame. This end is capped with a test cap. The freeze expansion pipe situated at the left end of the risers is similarly constructed as the right side freeze expansion pipe. An enlarged and more detailed drawing of the right freeze expansion pipe (which is constructed similarly to the left freeze expansion pipe) is shown in FIG. 3.

Referring now to FIG. 2, a cross-sectional view is shown taken across two risers 16 with their connecting heat absorbing panels 22 and the attachment means, namely elongated "C" clamp 32. As can be seen, heat absorbing panels 22 have 75 percent to 80 percent of their surface protruding outward from riser 16 with just a small part, 20 percent to 25 percent, folded over, and then have a curved or arcuate shape placed in the smaller portion, preferably of the same radius as the O.D. radius of the riser. That smaller curved portion is adapted to rest up against the side of riser 16 in a touching manner in order to conduct heat. To hold the arcuate portion of panels 22 next to riser 16, elongated "C" clamp 32 encapsulates a substantial portion of riser 16 and the curved portions of the two solar panels 22. When the solar heat absorbing panels are attached to the risers, "C" clamp 32 brings all of the parts together in a tight touching fit with no gaps as shown in FIG. 2. FIG. 2 was shown exploded for the purpose of illustrating the construction. "C" clamp 32 is elongated to cover the complete length of the panels so that all portions of the curved part of the panels will be firmly pressed to the side of riser 16. It is anticipated that in the preferred embodiment there may be one or two elongated "C" clamps for each riser. If one is utilized, the clamp then would be as long as the panel. If two were utilized, the clamps would be approximately ½ the length of the panel. It is obvious that multiple individual short "C" clamps could also be utilized, however, complete touching of the absorber panels 22 to the sides of risers 16 would not be as well assured with individual clamps as would be with a continuous "C" clamp. Obviously, for best results, there should be some spring in the opposite sides of the "C" clamps 32 such that they will always be forcibly pressing upon the curved portions of the panels.

Figure 3:
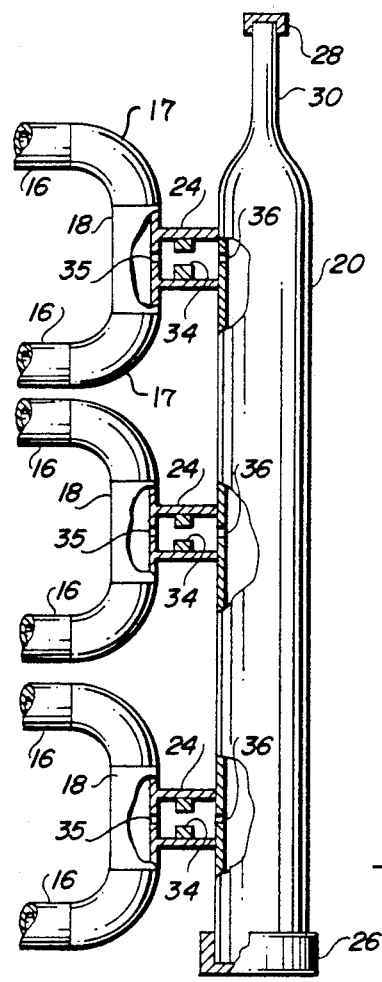
FIG. 3 is an enlarged bottom plan sectional view of the freeze expansion pipe and its connection to the serpentine piping of the risers.

Referring now to FIG. 3, an enlarged and more detailed sectional drawing is shown of right freeze expansion pipe 20 and its connection with the risers 16. Connecting the freeze expansion pipe 20 to the serpentine piping of the risers is bridge pipe 24. More specifically, one end of bridge pipe 24 is soldered or welded to freeze expansion pipe 20 and the other end is soldered or welded to manifold pipe 18. As mentioned before, to both ends of manifold pipe 18 are attached 90 degree elbows 17, of which there are two, and the other end of the elbows are attached to risers 16. All joints are soldered or welded in accordance with the custom in the trade.

Bridge pipe 24 can take one of two forms, i.e., either a pipe of the same inside diameter as that of the risers and manifold as shown in FIG. 3 or, bridge pipe 24 may be a smaller, reduced inside diameter than that of the risers or manifold pipes, such as shown in FIG. 1. The particular type of water flow restricting device utilized determines the size of bridge pipe 24. If bridge pipe 24 is not of a reduced diameter, then a plug with orifice 34 shown in FIG. 3 is fitted interiorly to pipe 24, obviously to restrict the flow of water through bridge pipe 24 as would the reduced diameter pipe. Alternate embodiments are also shown in FIG. 3 wherein small opening 35 is drilled into manifold pipe 18 or opening 36 is drilled into freeze expansion pipe 20 in the portion of the pipes which are covered over and enclosed by bridge pipe 24. This serves the same purpose as the reduced diameter bridge pipe or the orifice.

The whole purpose of the reduced diameter bridge pipe or, the utilization of an orifice interiorly to the bridge pipe 24, or drilling a small opening into the freeze expansion pipe 20 or manifold pipe 18 is to restrict the flow of water through that orifice so that water passing in the serpentine risers will not flow from one riser to another riser further up the line. Water is to be confined to the serpentine path taken by the risers and not short cycle.

However, in the event of freezing, as the ice forms in the middle portion of the risers in the absorber panel, water not yet frozen will be pushed through the orifices or through the reduced diameter bridge pipe and to push upon and cause test cap 28 shown in FIG. 3 to rupture, allowing the water to run out. It is conceivable that two or more of the water flow restricting devices be employed simultaneously, yet that does not appear needed for the invention to function. Any one of the four methods to restrict the flow of water will prove sufficient.

It is important that at least one of the water flow restricting means shown in FIGS. 1 and 3 be incorporated in each of connections of the bridge pipes, the manifold pipes, and freeze expansion pipes.

Also shown in FIG. 3 is the narrowed neck extension pipe 30 at the top end of right and left freeze expansion pipe 20, extension pipe 30 in each case capped with test cap 28. Test cap 28 is a rupturable cap commonly available in the industry. Lastly, at the bottom of each of the freeze expansion pipes 20 is the pressure cap 26, it serving as a means of closing off pipe 20. As a rule, absorbers pipe connections are rated at 650 psi. By example, test cap 28 will rupture at about 200 psi.

While a preferred embodiment of the invention, together with alternate embodiments, has been shown and described, it is appreciated that other such embodiments of the invention are possible and that there is no intent to limit the invention by such disclosure, but rather it is intended to cover all modifications and alternate embodiments falling within the spirit and the scope of the invention as defined in the appended claims.

I claim:

1. An improvement in a solar water heater absorber within a collector for controlling freeze damage due to ice formation, the absorber having a plurality of horizontal spaced apart parallel risers for fluid flow arranged with vertical manifolds alternately connecting risers to place the risers in a serpentine type fluid flow configuration within which passes a fluid to be solar heated, the improvement comprising:
   a freeze expansion pipe operably attached to the manifolds to controllably receive water displaced from the risers by ice formed in the risers; and
   bridge pipes having two ends, said bridge pipes connected at one end to said freeze expansion pipe and the other end to the manifolds attached to each riser, said bridge pipes passing displaced water from the risers to the freeze expansion pipe; and
   means to restrict water flow through said bridge pipes while not impeding water flow through the risers whereby damage to the risers caused by the formation of ice therein is thereby prevented.

2. The improvement in a solar water heater absorber as defined in claim 1 wherein said freeze expansion pipe includes an operably connected test cap, said test cap adapted to rupture to expel displaced water received by said freeze expansion pipe.

3. The improvement in a solar water heater absorber as defined in claim 2 wherein said freeze expansion pipe includes a neck passing through the collector, said neck having attached to it said test cap whereby when pressure builds up in said freeze expansion pipe due to the receipt of water displaced by the ice forming in the risers, said test cap ruptures and releases water exteriorly to the collector.

4. The improvement in a solar water heater absorber as defined in claim 3 further including a pair of freeze expansion pipes operably attached to the manifolds of the riser configuration.

5. The improvement in a solar water heater absorber as defined in claim 4 wherein said means to restrict water flow through said bridge pipes includes a plug with an orifice therethrough, said plug residing internally to said bridge pipe, said plug orifice restricting the water flow through said bridge pipes.

6. The improvement in a solar water heater absorber as defined in claim 4 wherein said means to restrict water flow through said bridge pipes includes openings formed in said freeze expansion pipe, said openings located at the connection of each of said bridge pipes with said freeze expansion pipe, and said openings encompassed by each of said bridge pipes.

7. The improvement in a solar water heater absorber as defined in claim 4 wherein said means to restrict water flow through said bridge pipes includes openings formed in each of the manifolds, said openings located at the connection of each of said bridge pipes with the manifolds, and said openings encompassed by each of said bridge pipes.

* * * * *